July 3, 1962
B. M. CRAIG
3,042,739
CORD HOLDER ATTACHMENT FOR ELECTRICAL OUTLETS
Filed Aug. 17, 1959
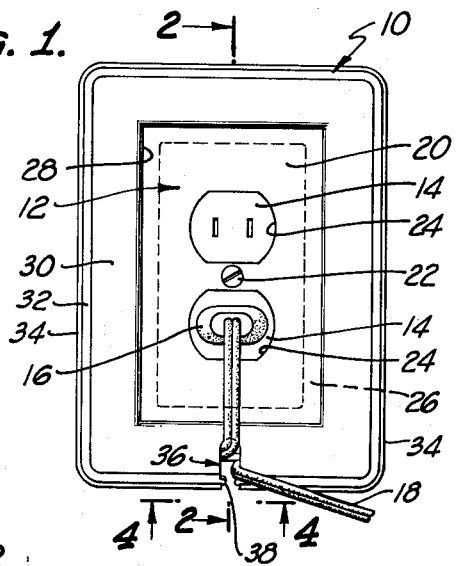
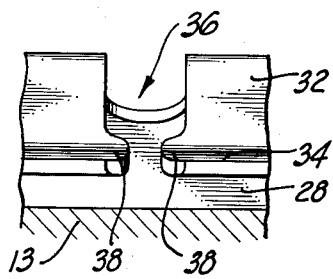
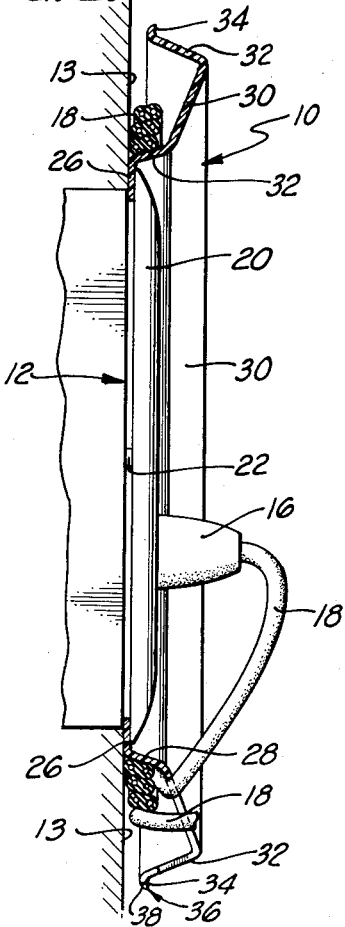
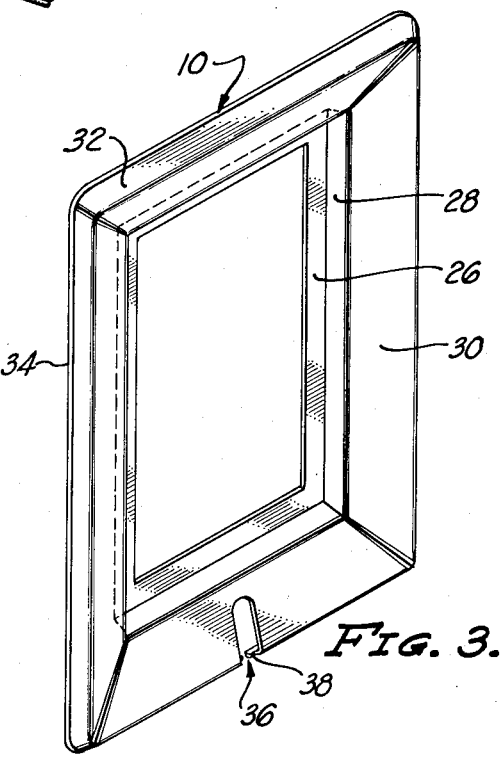
INVENTOR
BURNIE M. CRAIG
BY HIS ATTORNEYS
HARRIS, KIECH, RUSSELL & KERN

United States Patent Office 3,042,739
Patented July 3, 1962

3,042,739
CORD HOLDER ATTACHMENT FOR
ELECTRICAL OUTLETS
Burnie M. Craig, Pasadena, Calif., assignor to Henry Keck Associates, South Pasadena, Calif., a partnership
Filed Aug. 17, 1959, Ser. No. 834,322
1 Claim. (Cl. 174—66)

My invention relates to a cord holder attachment for electrical fixtures such as outlets and more particularly to a cord holder attachment adapted to accommodate and conceal the excess or surplus amount of an electrical cord.

Since electrical outlets are not always adjacent the proposed locations of electrical appliances, such appliances are conventionally provided with cords of considerable length. It has been a long known objection to electrical appliances having long cords that when the full amount of electrical cord is not used the excess must lie exposed on the floor of the room creating a hazardous and unsightly condition.

It is accordingly the general object of this invention to provide a novel cord holder that will accommodate any excess electrical cord and hide it from view.

A more specific object of the invention is to provide a cord holder which is particularly adapted for use with electric fixtures such as outlets.

An additional object of the invention is to provide a cord holder including a novel integral means for securing it to an electrical outlet.

Another object of the invention is to provide a cord holder including a novel covered spool portion.

Still another object of the invention is to provide an attachment adapted to be secured to the face plate of an electrical outlet and having a spool portion on which any excess electrical cord may be wound and hidden from view.

A further object of the invention is to provide a cord holder secured to the face plate of an electrical outlet including a spool portion on which excess electrical cord may be wound and a marginal flange member to hide the cord from view.

Still another and more specific object of the invention is to provide a cord holder including an inwardly directed securing flange defining the perimeter of a centrally located rectangular aperture and insertable between the face plate of an electrical outlet and a wall, or the like, in which the outlet is located, including a peripheral wall surrounding the securing flange and extending forwardly therefrom, and including a marginal flange member directed outwardly from the peripheral wall and spaced forwardly from the securing flange, the peripheral wall mentioned and the marginal flange member providing a spool portion on which any excess electrical cord may be wound and hidden from view by the marginal flange member.

A further object of the invention is to provide a cord holder having an inwardly directed securing flange defining the perimeter of a centrally located rectangular aperture having an area less than that of the face plate of an electrical outlet, thereby enabling the flange to be clamped between the face plate and the wall, or the like, in which the outlet is located, having a spool portion comprising a peripheral wall surrounding the securing flange and extending forwardly therefrom, and having a marginal beveled flange member directed outwardly from the peripheral wall, spaced forwardly from the securing flange, and terminating in a peripheral support bead at a point spaced forwardly of the wall, or the like, in which the outlet is located.

A final object of the invention is to provide a cord holder having an inwardly directed securing flange insertable between the face plate of an electrical outlet and a wall, or the like, in which the outlet is located, having a covered spool portion surrounding the securing flange, and having a cord receiving slot located in the spool portion and providing a passageway through which the cord may extend from the spool portion to the appliance and from the spool portion to the outlet.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:
FIG. 1 is a front elevational view showing the cord holder mounted on a conventional electrical outlet;
FIG. 2 is a partially sectional view taken along the arrowed line 2—2 of FIG. 1;
FIG. 3 is a perspective view of the cord holder; and
FIG. 4 is an enlarged, fragmentary elevational view taken along the arrowed line 4—4 of FIG. 1.

Referring now to the drawing, and in particular to FIGS. 1 and 2, the cord holder attachment is indicated by the numeral 10 and is shown mounted on a common dual electrical outlet 12 located in a wall 13 and having sockets 14 for receiving a plug 16 terminus of an electrical cord 18. The dual electrical outlet 12 has a face plate 20 removably secured thereto by a screw 22 and providing apertures 24 for exposing the sockets 14.

The cord holder 10 includes an inwardly directed securing flange 26 having end portions spaced vertically apart less than the height of the face plate 20 and side portions spaced horizontally apart less than the width of the face plate. Consequently, the flange 26 defines the perimeter of a centrally located rectangular aperture of lesser area than the face plate 20 so that the flange may be clamped between the face plate 20 and the wall 13 in order to secure the cord holder 10 thereto.

About the periphery of the inwardly directed securing flange 26 is a wall member 28 extending forwardly therefrom and having at its forward edge an integrally formed marginal flange member 30 inclined forwardly and outwardly from the peripheral wall 28. Located at the outer edge of the marginal flange member 30 is an outwardly and rearwardly extending flange 32 terminating in an outwardly directed peripheral support bead or stiffening portion 34 at a point spaced forwardly of the wall 13. The marginal flange member 30, the rearwardly extending flange 32, and the support bead 34 are resilient members, thereby permitting the bead 34 to be deflected away from the wall 13 when the cord is wound about the holder 10. Thus the support bead 34 supports or retains the cord 18 within the holder even if the cord has a tendency to droop or straighten out. The space between the support bead 34 and the wall 13 permits circulation of air about the cord 18.

The peripheral wall 28, the marginal flange member 30, and the rearwardly and outwardly extending flange 32, together with the wall 13, comprise the spool portion of the cord holder 10.

In normal usage, the cord holder 10 is mounted on the electrical outlet 12 by removing the screw 22 and the face plate 20 and then reinstalling these elements with the securing flange 26 between the face plate 20 and the wall 13, thereby clamping the securing flange between the wall and the face plate. The holder is now in operational position with the centrally located rectangular aperture allowing the face plate to be exposed which, in turn permits easy access to the outlet sockets 14 revealed by the apertures 24.

When the contacts of the electrical plug 16 are inserted into one of the sockets 14 of the outlet 10, the excess electrical cord 18 extending from the plug 16 is brought downwardly and through a slot 36 in the marginal flange member 30 and wound about the peripheral wall 28 which acts as a spool surface. The marginal flange member 30 and the wall 13 channel the cord over the peripheral wall 28 and the outer portion of the flange member 30 and the rearwardly and outwardly extending flange 32 conceal it from view. When the excess slack in the cord 18 has been taken up by winding it about the spool portion, the cord is again brought through the slot 36, with the free end now leading to the electrical appliance. The slot is shown (FIG. 4) as partially closed at its mouth by opposed tongues 38. The tongues 38 are resilient and allow the cord to be moved into and out of position on the spool portion while also serving to prevent accidental displacement of the cord.

It will be understood that while only one plug 16 is shown, the holder is capable of handling a second plug in the same manner, the excesses of both cords being wound on the spool portion.

Although an exemplary embodiment of the invention has been disclosed, it will be understood that other applications of the invention are possible and that the embodiment disclosed may be subjected to various changes, modifications and substitutions without departing from the spirit of the invention as defined by the following claim.

I claim:

A cord holder adapted to be mounted between the face plate of an electrical outlet and a wall upon which the face plate is arranged, said cord holder including: a rectangular, planar, inwardly directed, continuous, securing flange adapted to be secured parallel to the wall surface, said flange being defined by opposed end portions spaced apart less than the height of the face plate and by side portions which are spaced apart less than the width of the face plate, allowing said flange to be firmly secured between the face plate and the adjacent wall surface; an integral, rectangular, continuous, spool forming, wall member extending abruptly forwardly and flaring outwardly from the periphery of all four sides of said securing flange; a resilient, rectangular, continuous, marginal flange formed integrally with and extending forwardly and outwardly from all four sides of the wall member, said marginal flange flaring forwardly less abruptly than the flaring of the spool forming wall member; and a rectangular, integral, outwardly flaring and rearwardly extending flange extending from said marginal flange across all four sides of the spool forming wall member, said last mentioned flange terminating in a peripheral, rectangular, outwardly directed, stiffening bead, said marginal flange, said rearwardly extending flange, and said bead having aligned cord receiving slots therein.

References Cited in the file of this patent
UNITED STATES PATENTS

| | | |
|---|---|---|
| 2,231,001 | Engstrom | Feb. 11, 1941 |
| 2,438,143 | Brown | Mar. 23, 1948 |
| 2,510,745 | Kilgore | June 6, 1950 |